US007620323B2

(12) United States Patent
Strasser et al.

(10) Patent No.: US 7,620,323 B2
(45) Date of Patent: Nov. 17, 2009

(54) METHOD AND APPARATUS FOR INTERCONNECTING A PLURALITY OF OPTICAL TRANSDUCERS WITH A WAVELENGTH DIVISION MULTIPLEXED OPTICAL SWITCH

(75) Inventors: Thomas Andrew Strasser, Warren, NJ (US); Paul Bonenfant, Ocean, NJ (US); Per Bang Hansen, Rumson, NJ (US); Torben N. Nielsen, Monmouth Beach, NJ (US); Ken R. Roberts, Little Silver, NJ (US); Jefferson L. Wagener, New Hope, PA (US)

(73) Assignee: Meriton Networks US Inc., Wilmington, DE (US)

( * ) Notice: Subject to any disclaimer, the term of this patent is extended or adjusted under 35 U.S.C. 154(b) by 653 days.

(21) Appl. No.: 10/099,890

(22) Filed: Mar. 15, 2002

(65) Prior Publication Data

US 2002/0145779 A1 Oct. 10, 2002

Related U.S. Application Data

(60) Provisional application No. 60/276,310, filed on Mar. 16, 2001.

(51) Int. Cl.
 *H04J 14/00* (2006.01)
(52) U.S. Cl. .............................. 398/50; 398/2
(58) Field of Classification Search ............ 398/25, 398/2, 34
 See application file for complete search history.

(56) References Cited

U.S. PATENT DOCUMENTS

| 5,267,309 A | 11/1993 | Sanders et al. ............ 379/399 |
| 5,739,932 A | 4/1998 | Tomooka et al. ........... 359/110 |
| 5,793,909 A | 8/1998 | Leone et al. .................. 385/24 |
| 5,920,414 A | 7/1999 | Miyachi et al. ............. 359/133 |

(Continued)

OTHER PUBLICATIONS

Byeong-Hoon Kim et al., "Transmission of 2.5 Gbps Signal over 640km Using 16 Channel Full Add/Drop WDM System," Conference on Communications, APCC/OECC, Oct. 18-22, 1999, pp. 306-308.

(Continued)

*Primary Examiner*—Shi K Li
(74) *Attorney, Agent, or Firm*—Mayer & Williams PC; Stuart H. Mayer, Esq.; Karin L. Williams, Esq.

(57) ABSTRACT

In a WDM optical communication system that includes a plurality of nodes interconnected by communication links, a node is provided that includes a first plurality of transponders each generating and/or receiving an information-bearing optical signal at a different channel wavelength from one another. An optical coupling arrangement, which may include one or more reconfigurable optical switches, transfers the channel wavelengths between a link connected to the node and the first plurality of transponders. The arrangement is adaptable to reconfigure its operational state to selectively direct different ones of the channel wavelengths from the link to different ones of the transponders without disturbing the optical path through the node traversed by any other channel wavelengths. A communications and configuration arrangement is provided, which transfers data identifying the respective channel wavelengths at which the transponders operate from the transponders to the optical coupling arrangement. In response to the transferred data, the communications and configuration arrangement reconfigures the operational state of the optical coupling arrangement.

19 Claims, 8 Drawing Sheets

RECONFIGURABLE MUX/DEMUX TO ENABLE WAVELENGTH INDEPENDENT TRANSPONDER
SLOTS THAT CAN BE WIRED WITH FIXED OPTICAL CONNECTIONS AND SEND/RECEIVE ANY λ

U.S. PATENT DOCUMENTS

| | | | | |
|---|---|---|---|---|
| 5,953,141 | A | 9/1999 | Liu et al. | 359/124 |
| 5,995,256 | A * | 11/1999 | Fee | 398/34 |
| 5,999,288 | A | 12/1999 | Ellinas et al. | 359/119 |
| 6,067,389 | A | 5/2000 | Fatehi et al. | 385/17 |
| 6,081,359 | A | 6/2000 | Takehana et al. | 359/133 |
| 6,084,694 | A * | 7/2000 | Milton et al. | 398/83 |
| 6,101,011 | A | 8/2000 | Taylor | 359/124 |
| 6,108,113 | A | 8/2000 | Fee | 359/124 |
| 6,154,728 | A | 11/2000 | Sattar et al. | 705/28 |
| 6,169,994 | B1 | 1/2001 | Lennert et al. | 707/104 |
| 6,195,186 | B1 | 2/2001 | Asahi | 359/110 |
| 6,272,154 | B1 | 8/2001 | Bala et al. | 370/535 |
| 6,288,811 | B1 | 9/2001 | Jiang et al. | 359/127 |
| 6,295,149 | B1 * | 9/2001 | Meli | 398/9 |
| 6,321,255 | B1 * | 11/2001 | May et al. | 709/216 |
| 6,411,412 | B1 * | 6/2002 | Jiang et al. | 398/59 |
| 6,414,765 | B1 * | 7/2002 | Li et al. | 398/5 |
| 6,516,105 | B1 * | 2/2003 | Khusid et al. | 385/15 |
| 6,587,470 | B1 * | 7/2003 | Elliot et al. | 370/404 |
| 6,697,546 | B2 * | 2/2004 | Ibukuro et al. | 385/16 |
| 6,856,594 | B1 * | 2/2005 | Aihara et al. | 370/228 |
| 7,136,586 | B2 * | 11/2006 | Sharratt et al. | 398/48 |
| 2003/0163555 | A1 * | 8/2003 | Battou et al. | 709/223 |
| 2004/0085345 | A1 * | 5/2004 | Galou et al. | 345/734 |

OTHER PUBLICATIONS

Stern et al., *Multiwavelength Optical Networks: A Layered Approach* (Prentice-Hall, May 1999), pp. 607-654.
U.S. Appl. No. 09/571,833, Wagener et al., filed May 16, 2000.
U.S. Appl. No. 09/691,812, Wegener et al., filed Oct. 19, 2000.

* cited by examiner

FIG. 1

RECONFIGURABLE MUX/DEMUX TO ENABLE WAVELENGTH INDEPENDENT TRANSPONDER SLOTS THAT CAN BE WIRED WITH FIXED OPTICAL CONNECTIONS AND SEND/RECEIVE ANY λ

BIDIRECTIONAL INPUTS/OUTPUTS WITH INDEPENDENT WAVELENGTH DISTRIBUTION

FIG. 4

MID-AMPLIFIER SWITCH TO ADD/DROP CHANNELS TO SEPARATE SERVICE PATHS ON A UNIDIRECTIONAL FIBER PAIR SYSTEM

FIG. 5

SWITCHING SYSTEM TO ADD/DROP SIGNALS WITH INDEPENDENT NODE PATHS (LINK AND NODE DISJOINT)

FIG. 6

MID-AMPLIFIER SWITCH TO ADD/DROP WITH DISJOINT NODE PATHS
USING A LOW COST PASSIVE COUPLER TO ADD SIGNALS

FIG. 7

INEXPENSIVE ADD/DROP WITH LINK NODE DISJOINT PATHS
WITHOUT WAVELENGTH REUSE DUE TO NO WAVELENGTH BLOCKING
(ENABLES DROP AND CONTINUE OF SIGNAL)

FIG. 8

MID-AMPLIFIER SWITCHING SYSTEM WITH PER WAVELENGTH ADD/DROP,
DROP AND CONTINUE SIGNALS WITH INDEPENDENT EAST/WEST NODE PATHS
(WITH OPTIONAL WAVELENGTH BLOCKING)

METHOD AND APPARATUS FOR INTERCONNECTING A PLURALITY OF OPTICAL TRANSDUCERS WITH A WAVELENGTH DIVISION MULTIPLEXED OPTICAL SWITCH

STATEMENT OF RELATED APPLICATION

This application claims the benefit of priority to U.S. Provisional Patent Application No. 60/276,310, filed Mar. 16, 2001, entitled "Reconfigurable Optical System."

FIELD OF THE INVENTION

The invention relates generally to wavelength division multiplexed optical communication systems, and more particularly, to wavelength division multiplexed optical communication systems which include reconfigurable optical switches.

BACKGROUND OF THE INVENTION

Wavelength division multiplexing (WDM) has been explored as an approach for increasing the capacity of fiber optic networks to support the rapid growth in data and voice traffic applications. A WDM system employs plural optical signal channels, each channel being assigned a particular channel wavelength. In a WDM system, signal channels are generated, multiplexed, and transmitted over a single waveguide, and demultiplexed to individually route each channel wavelength to a designated receiver. Through the use of optical amplifiers, such as doped fiber amplifiers, plural optical channels are directly amplified simultaneously, facilitating the use of WDM systems in long-distance optical systems.

Proposed wavelength division multiplexed optical communication systems typically include multiplexer and demultiplexer switching elements which permit only a fixed number of optical channels to be used in the optical system. In one optical system configuration, for instance, the multiplexed signal is broken down into its constituent optical signals through the use of an integrated frequency router demultiplexer. The frequency router uses silicon optical bench technology in which plural phosphorus-doped silica waveguides are disposed on a silicon substrate. An optical star outputs to an array of N waveguides having adjacent optical path lengths which differ by q wavelengths; this array in turn feeds an output N×N star. Such a frequency router design for an optical communication system is described in Alexander et al., J. Lightwave Tech., Vol. 11, No. 5/6, May/June 1993, p. 714. Using a 1×N configuration at the input, a multiplexed optical signal containing light of different frequencies is separated into its component frequencies at each waveguide extending from the output N×N star. Although this configuration adequately separates light of different frequencies, the integrated optical design fixes both the number and the respective wavelengths of the optical channels. Additionally, each wavelength has a fixed relationship between a particular pair of input and output ports of the routing element.

The deployment and serviceability of the aforementioned switching elements becomes problematic as the number of channels, and hence the number of input and output ports, increases to support future DWDM networks, which may have anywhere from 256 to thousands of channels. Since each port is assigned a unique wavelength that cannot be changed, a field technician must ensure that the proper transmitter operating at the appropriate wavelength is connected to the proper port of the switching element. These connections are typically manually provisioned to the front bay of the switching element. Assuming fixed-wavelength transmitters are employed, the technician may be required to install thousands of different transmitters so that each transmitter is properly connected to its corresponding port. Accordingly, this installation procedure can be quite time consuming and prone to error, while also requiring that it be performed by a skilled technician.

Ideally, a so-called "plug and play" approach would be employed in which the technician connects any one of a series of transmitters to any of the ports of the switching element so that provisioning can be accomplished quickly and in a nearly error-free manner by a technician having minimal training.

SUMMARY OF THE INVENTION

In a WDM optical communication system that includes a plurality of nodes interconnected by communication links, the present invention provides a node that includes a first plurality of transponders each generating and/or receiving an information-bearing optical signal at a different channel wavelength from one another. An optical coupling arrangement transfers the channel wavelengths between a link connected to the node and the first plurality of transponders. The arrangement is adaptable to reconfigure its operational state to selectively direct different ones of the channel wavelengths from the link to different ones of the transponders without disturbing the optical path through the node traversed by any other channel wavelengths. A communications and configuration arrangement is provided, which transfers data identifying the respective channel wavelengths at which the transponders operate from the transponders to the optical coupling arrangement. In response to the transferred data, the communications and configuration arrangement reconfigures the operational state of the optical coupling arrangement.

In accordance with one aspect of the invention, the first plurality of transponders respectively include a plurality of receivers receiving the information-bearing optical signals. The communications and configuration arrangement reconfigures the operational state of at least the portion of the optical coupling arrangement transferring the channel wavelengths from the link to the first plurality of transponders so that the transponders can receive optical signals at the channel wavelengths at which they respectively operate.

In accordance with another aspect of the invention, the transponders each include an identifying element containing data identifying the respective channel wavelengths at which the transponders operate. Moreover, the optical coupling arrangement has a receiving element for obtaining the data contained in the identifying element.

In accordance with yet another aspect of the invention, the optical coupling arrangement includes a tunable coupling arrangement for selectively transferring the different ones of the channel wavelengths from the link to the first plurality of transponders. The optical coupling arrangement also includes a passive coupling arrangement for directing the channel wavelengths from the transponders to the link.

In accordance with another aspect of the invention, the optical coupling arrangement includes a reconfigurable optical switch having at least three ports. The reconfigurable optical switch is adaptable to reconfigure its operational state to receive at any of the ports any of the channel wavelengths at which the first plurality of transponders operate and direct the channel wavelengths to any of the other ports of the optical switch.

In accordance with another aspect of the invention, the optical coupling arrangement includes a reconfigurable optical switch having at least three ports. The reconfigurable optical switch is adaptable to reconfigure its operational state to receive at a plurality of the ports any of the channel wavelengths at which the first plurality of transmitters operate and direct the channel wavelengths to any remaining ones of the ports of the optical switch.

In accordance with another aspect of the invention, a second plurality of transponders is provided, which serve as backup transponders in the event of a failure in one or more of the transponders in the first plurality of transponders.

In accordance with another aspect of the invention, the optical coupling arrangement includes at least two reconfigurable optical switches each having at least three ports. A first of the reconfigurable optical switches is adaptable to reconfigure its operational state to drop channel wavelengths to the first plurality of transponders and to receive channel wavelengths from the second plurality of transponders. A second of the reconfigurable optical switches is adaptable to reconfigure its operational state to drop channel wavelengths to the second plurality of transponders and to receive channel wavelengths from the first plurality of transponders.

In accordance with yet another aspect of the invention, the first and second plurality of transponders are arranged in transponder pairs comprising transponders from each of the first and second plurality of transponders. The transponders in each of the transponder pairs may be located in adjacent slots in electrical connection with one another for transferring electrical data signals therebetween.

In accordance with another aspect of the invention, the optical coupling arrangement includes at least four reconfigurable optical switches. A first transponder in each of the transponder pairs transmits and receives channel wavelengths to first and second ones of the reconfigurable optical switches, respectively. A second transponder in each of the transponder pairs transmits and receives channel wavelengths to third and fourth ones of the reconfigurable optical switches, respectively.

In accordance with another aspect of the invention, the optical coupling arrangement includes at least two passive coupling arrangements and two reconfigurable optical switches each having a plurality of ports. A first transponder in each of the transponder pairs sends and receives channel wavelengths from a first of the passive coupling arrangements and a first of the optical switches associated therewith. A second transponder in each of the transponder pairs sends and receives channel wavelengths from a second of the passive coupling arrangements and a second of the optical switches associated therewith.

In accordance with another aspect of the invention, a method is provided for assigning channel wavelengths to a plurality of ports of an optical switch. The method begins by receiving a plurality of transmitters in the plurality of the ports of the optical switch. The transmitters are operable at distinct wavelengths from one another. Data is obtained from the transmitters identifying one or more operating characteristics of the transmitters, which characteristics include the distinct wavelengths at which the transmitters respectively operate. Based on the data obtained from the transmitters, the optical switch is configured so that the plurality of ports are assigned channel wavelengths respectively corresponding to the distinct wavelengths of the transmitters received in the plurality of ports.

In accordance with another aspect of the invention, the data may be manually input by a technician or read directly from the transmitter.

In accordance with another aspect of the invention, the plurality of transmitters are received in a plurality of transponder slots, each of which optically communicates with a predetermined one of the ports of the optical switch. The plurality of transponder slots may be optically coupled with the ports of the optical switch via an optical backplane.

In accordance with another aspect of the invention, a method is provided for automatically provisioning a service in an optical transmission system having a plurality of nodes, at least one of which includes at least one optical switch, The method begins by identifying a transponder coupled to a given port of an optical switch and which is associated with the service to be provisioned. The optical switch is configured so that the given port is assigned a channel wavelength based at least in part on the identification of the transponder.

In accordance with another aspect of the invention, a first protection scheme is provided for the service being provisioned. In some cases the first protection scheme may be selectively switched to a second protection scheme for the service being provisioned.

In accordance with another aspect of the invention, the first protection scheme is selected from the group consisting of a dedicated protection scheme, a shared protection scheme, a dual homing path protection, a dual ring interworking scheme, and a 1:N protection scheme.

DETAILED DESCRIPTION

In accordance with the present invention, a WDM optical transmission system is provided which employs reconfigurable switching elements that can dynamically change the channel wavelength that is routed between any pair of input and output ports. By employing such switching elements, the present invention provides a "plug and play" arrangement in which any transmitter can be connected to any input port of the switching element, after which the switching element is reconfigured so that its input ports are assigned to the operating wavelengths of the transmitters respectively connected to those ports, thus allowing the wavelengths to be properly routed through the switching element.

Recently, switching elements that provide a degree of reconfigurability have become available. These reconfigurable optical elements can dynamically change the path along which a given wavelength is routed to effectively reconstruct the topology of the network as necessary to accommodate a change in demand or to restore services around a network failure. Examples of reconfigurable optical elements include optical Add/Drop Multiplexers (OADM) and Optical Cross-Connects (OXC). OADMs are used to separate or drop one or more wavelength components from a WDM signal, which is then directed onto a different path. In some cases the dropped wavelengths are directed onto a common fiber path and in other cases each dropped wavelength is directed onto its own fiber path. OXCs are more flexible devices than OADMs, which can redistribute in virtually any arrangement the components of multiple WDM input signals onto any number of output paths. Unfortunately, current OXC's generally employ optoelectronic regeneration at their network interfaces, thus requiring optical-to-electrical interfaces into and out of the cross-connect. Such an arrangement gives rise to a number of limitations, including a relatively high insertion loss because the optical signals must pass through three discrete components. In addition, the components are relatively expensive while still not providing a completely flexible switch that can transfer light between any two subsets of the ports. Finally, because of their high loss as well as the need to provide channels with equal power, such OXC's typically employ optoelectronic regenerators on at least their output side, and in many instances on their input side as well. While these regenerators overcome the problem of insertion loss and effectively allow wavelength conversion of the signal as it traverses the switch fabric, they substantially add to the cost of an already expensive switch fabric because a regenerator is required for each and every wavelength that is used in the network.

More flexible still are all-optical reconfigurable switches which have much lower insertion losses and are less expensive than the aforementioned OXC's. Various examples of all-optical reconfigurable optical switches are disclosed in U.S. patent application Ser. No. 09/571,833, which is hereby incorporated by reference in its entirety, and in particular FIGS. 2-4 of that reference. The switching elements disclosed therein can selectively direct any wavelength component from any input port to any output port, independent of the routing of the other wavelengths without the need for any electrical-to-optical conversion. Another all-optical reconfigurable optical switch that provides additional functionality is disclosed in U.S. patent application Ser. No. 09/691,812, which is hereby incorporated by reference in its entirety. This reference discloses an optical switching element in which each and every wavelength component can be directed from any given port to any other port without constraint. More specifically, unlike most optical switches, this switch is not limited to providing connections between a subset of input ports and a subset of output ports, or vice versa. Rather, this switch can also provide a connection between two ports within the same subset (either input or output). While the present invention may employ any of the aforementioned reconfigurable optical switches, the optical switch disclosed in U.S. patent application Ser. No. 09/691,812 will serve as an exemplary reconfigurable optical switch, and accordingly, additional details concerning this switch will be presented below.

Figure 1:
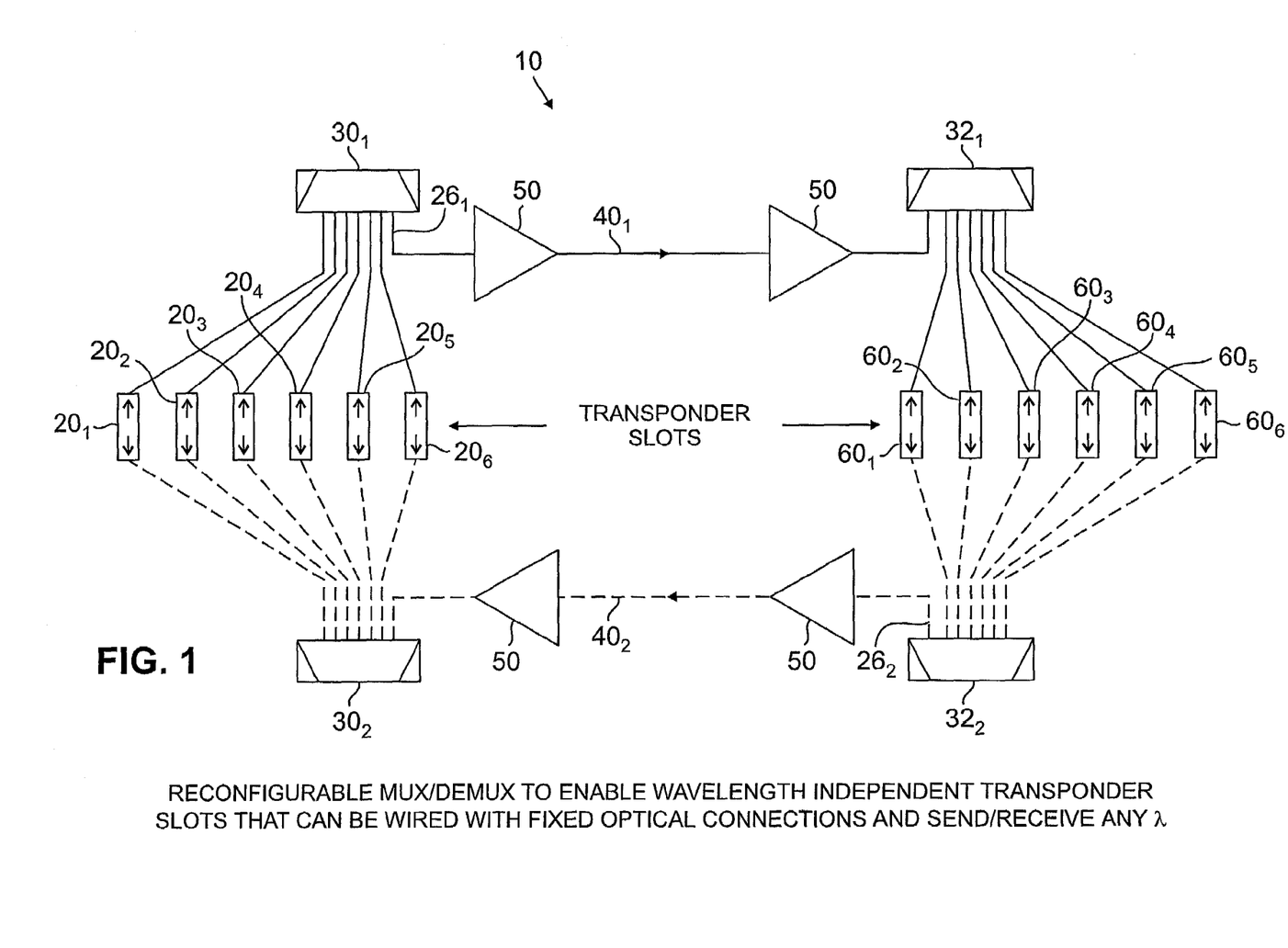
FIG. 1 is a schematic representation of a wavelength division multiplexed optical communication system in accordance with the present invention.

Turning now to the drawings in detail in which like numerals indicate the same or similar elements, FIG. 1 schematically depicts a bi-directional wavelength division multiplexed (WDM) optical communication system 10 according to one embodiment of the present invention. Optical communication system 10 includes optical transmission paths $40_1$ and $40_2$ for transporting information in opposite directions, a first pair of optical switches $30_1$ and $30_2$, which are typically co-located in a common node, a second pair of optical switches $32_1$, and $32_2$, which are also typically co-located in a common node, and a plurality of optical transponders $20_1$-$20_6$ and $60_1$-$60_6$, e.g., transmitter/receiver pairs, respectively assigned to the first and second pair of optical switches 30 and 32. Each optical transponder emits and receives an information-bearing optical signal at an optical channel wavelength that differs from transmitter to transmitter. The expression "information-bearing optical signal," as used herein, refers to an optical signal which has been coded with information, including, but not limited to, audio signals, video signals, and computer data. The WDM optical communication systems of the present invention include N channels, where N is a whole number greater than or equal to 2. Exemplary values for N are 4, 8, and 16 optical channels. In the optical system of FIG. 1, N is depicted as 6 for ease of illustration.

It should be noted at the outset that the present invention is not limited to WDM systems such as shown in FIG. 1, which have a point-to-point configuration consisting of end terminals or nodes spaced from each other by one or more segments of optical fiber. For example, in metropolitan areas, WDM systems having a ring or loop configuration are currently being developed. Such systems typically include a plurality of nodes located along the ring. At least one optical add/drop element, associated with each node, is typically connected to the ring with optical connectors. The optical add/drop element permits both addition and extraction of channels to and from the ring. One of the nodes, referred to as a hub or central office node, typically has a plurality of associated add/drop elements for transmitting and receiving a corresponding plurality of channels to/from other nodes along the ring. Of course, the present invention is equally applicable to other network topologies in addition to rings such as a mesh topology.

Figure 2:
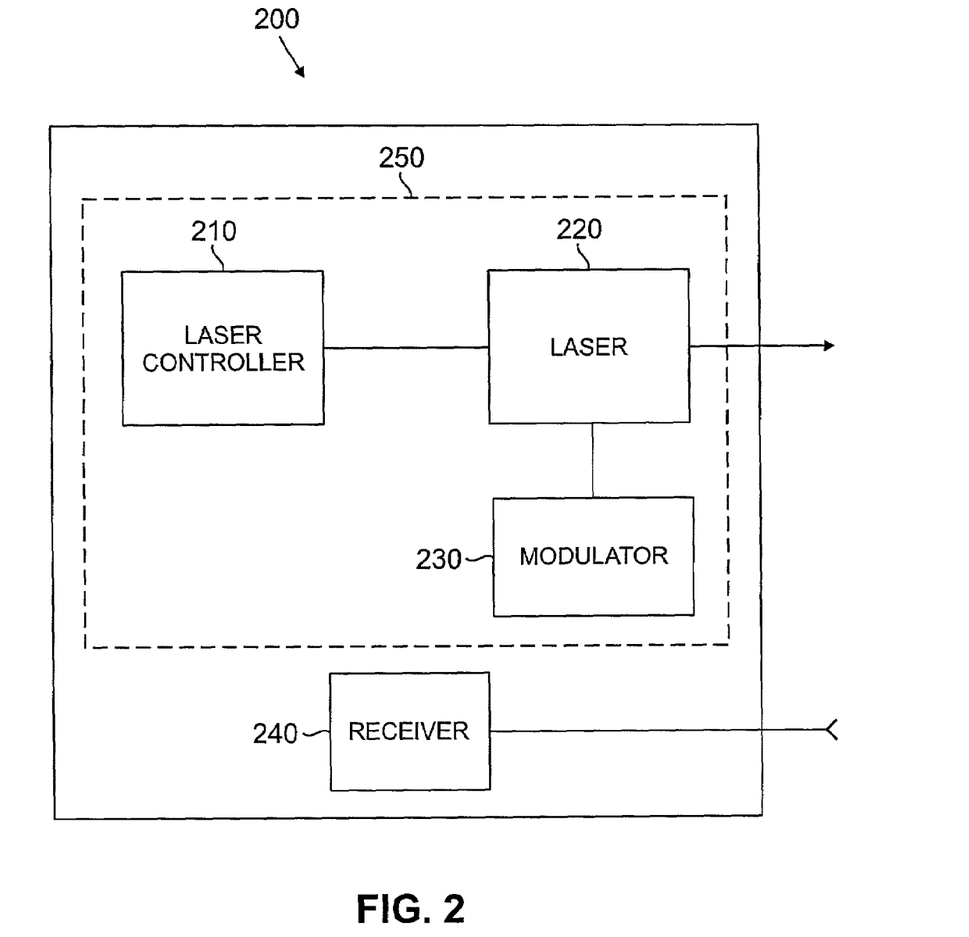
FIG. 2 is a schematic representation of an exemplary transponder in accordance with the present invention.

FIG. 2 shows an exemplary transponder 200 that may be employed as optical transponders $20_1$-$20_8$ and $60_1$-$60_8$ seen in FIG. 1. Transponder 200 includes a transmitter 250 and receiver 240. The receiver 240 generally detects the optical signal and converts it to an electrical signal, typically through the use of a photodiode device. The transmitter 250 generally includes a laser 220, such as a DFB semiconductor laser, a laser controller 210, and a modulator 230 for creation of an information-bearing optical signal. In an exemplary embodiment, the transmitter laser 220 is a DFB semiconductor diode laser, generally comprising one or more III-V semiconductor materials, commercially available from a wide variety of suppliers. The laser outputs an optical carrier signal at a particular wavelength assigned to its channel. The laser controller 210 provides the required laser bias current as well as thermal control of the laser 220. Using thermal control, the precise operating wavelength of the laser is maintained, typically to within a one-angstrom bandwidth or less.

The optical transmitter 250 typically includes a modulator 230 for imparting information to the optical carrier signal. An exemplary modulator is an external modulator, such as a Mach-Zehnder modulator, employing a waveguiding medium whose refractive index changes according to the applied electrical field, i.e., a material exhibiting an electro-optic effect. In the Mach-Zehnder configuration, two optical interferometer paths are provided. An incoming optical carrier signal is split between the two optical paths. At least one path of the interferometer is phase modulated. When the signal is recombined at the output, the light from the paths either constructively or destructively interferes, depending upon the electrical field applied to the surrounding electrodes during the travel time of the carrier. This recombination creates an amplitude-modulated output optical signal. The optical carrier signal can alternatively be directly modulated for some system applications. It is noted that while the above-described transmitters are exemplary, any transmitting elements capable of producing optical signals for use in an optical communication system can be employed in the WDM systems of the present invention.

Typically, the wavelengths emitted by the optical transmitters are selected to be within the 1500 nanometer range, the range in which the minimum signal attenuation occurs for silica-based fibers. More particularly, the wavelengths emitted by the optical transmitters are selected to be in the range from 1530 to 1560 nanometers. However, other wavelengths, such as those in the 1300-1500 nm range and the 1600 nm range, can also be employed in the WDM systems of the present invention. Optical transmitters may operate at a single fixed wavelength or they may be tunable to operate and any wavelength within a predefined range of wavelengths.

Each information-bearing optical signal produced by an optical transmitter constitutes a channel in optical system 10. In a WDM system, each channel is generally associated with a unique wavelength. As depicted in FIG. 1, six optical transponders $20_1$-$20_6$ are provided to create a six-channel wavelength division multiplexed optical communication system along transmission path $40_1$ and six optical transponders $60_1$-$60_6$ are provided to create a six-channel wavelength division multiplexed optical communication system along transmission path $40_2$. The optical transmitters located within transponders $20_1$-$20_6$ operate at channel wavelengths of $\lambda_1$-$\lambda_6$, respectively. These optical signal channels are output from transponders $20_1$-$20_6$ and are brought together in optical switch $30_1$ for conveyance to optical waveguide $40_1$ via output port $26_1$ in the form of a multiplexed optical signal. Optical switch $30_1$ has six input ports that are optically coupled to the six transponders $20_1$-$20_6$ through optical waveguides $22_1$-$22_6$. Likewise, the optical transmitters located within transponders $60_1$-$60_6$ also operate at channel wavelengths of $\lambda_1$-$\lambda_6$ respectively. These optical signal channels are output from transponders $60_1$-$60_6$ and are brought together in optical switch $32_2$ for conveyance to optical waveguide $40_2$ via output port $26_2$. Optical transmission path $40_1$ is typically an optical waveguide and is the principal transmission medium for the optical communication system. While the optical waveguide is generally selected from single-mode optical, any optical waveguiding medium which is capable of transporting multiple optical wavelengths can be employed as waveguide $40_1$ in optical system 10. Similar to optical switch $30_1$, optical switch $32_2$ provides a multiplexed optical signal along optical transmission path $40_2$. Following transmission and amplification of the multiplexed optical signals along waveguides $40_1$ and $40_2$, each channel must be demultiplexed and routed to the receiver located in the transponder designated for the particular optical signal channel.

Optionally, one or more optical amplifiers 50 are interposed along optical transmission paths $40_1$ and $40_2$. Optical amplifiers 50 are selected from any device which directly increases the strength of plural optical signals without the need for optical-to-electrical conversion. In general, optical amplifiers 50 are selected from optical waveguides doped with a material which can produce laser action in the waveguide. Such materials include rare earth dopants such as erbium, neodymium, praseodymium, ytterbium, or mixtures thereof. Pumping of the doped waveguide at a specific pump wavelength causes population inversion among the electron energy levels of the dopant, producing optical amplification of the wavelength division multiplexed optical signals. For doped fiber amplifiers employing erbium as the dopant, a wavelength band between approximately 1500 nm and approximately 1630 nm provides gain to optical signals when the doped fiber is pumped.

As previously mentioned, in a conventional WDM optical communication system optical switches $30_1$-$30_2$ and $32_1$-$32_2$ are generally based on multiplexers and demultiplexers that are fixed wavelength-dependent elements in which a given wavelength must be pre-assigned to a particular pair of input/output ports. As a result, each port must be connected to a different transponder that incorporates a transmitter operating at the wavelength associated with that port. As DWDM systems are implemented with an ever-increasing number of channels, installation of the transmitters becomes an increasingly complex task that is time-consuming and prone to error. However, in the present invention, this task is simplified by employing flexible optical switches instead of fixed-wavelength dependent switching elements. Such optical switches are reconfigurable elements that can dynamically change the channel wavelength that is assigned to its input and output ports.

Figure 3:
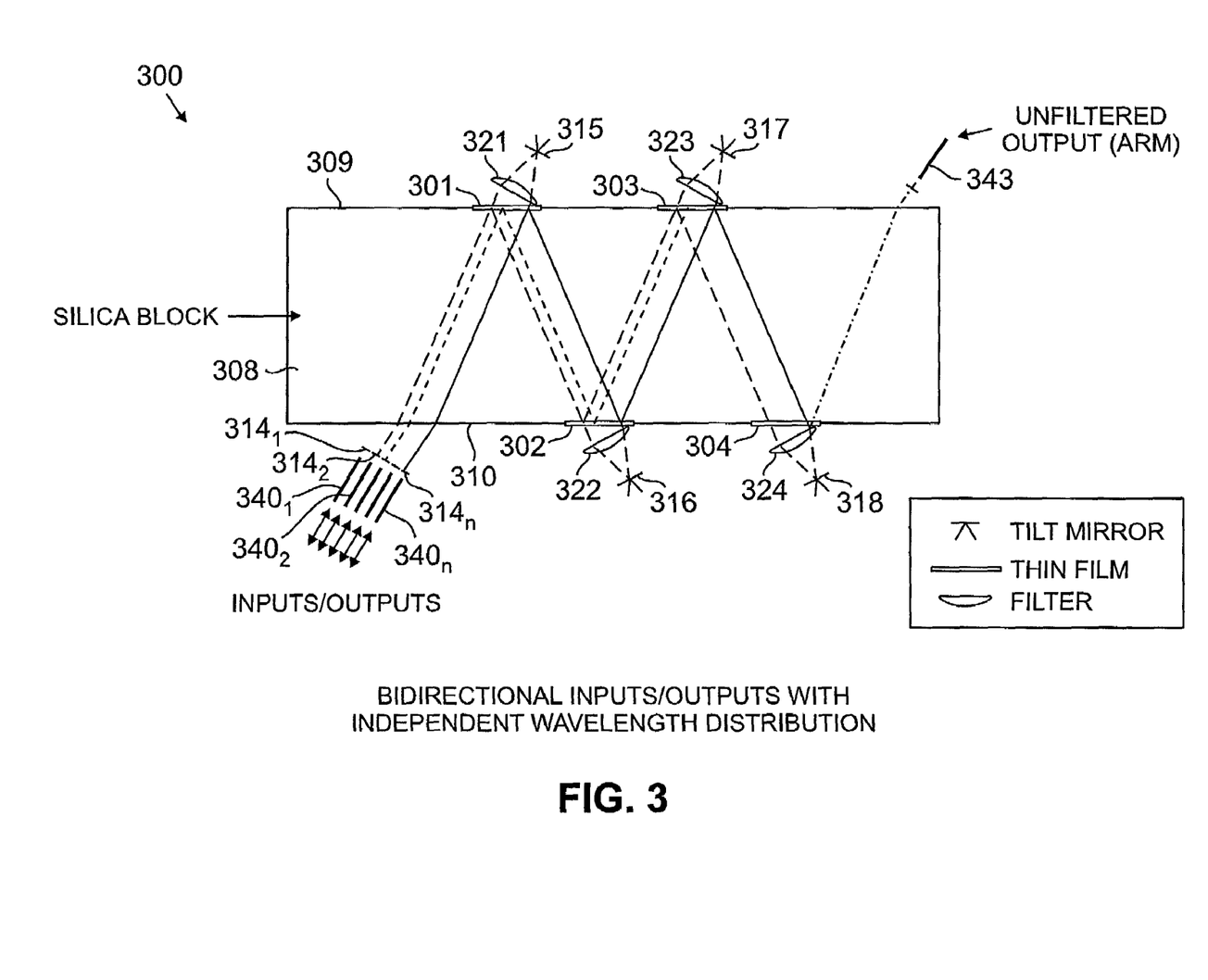
FIG. 3 shows an exemplary reconfigurable optical switch that may be employed in the present invention.

As previously mentioned, for purposes of illustration only the present invention will be depicted in connection with the reconfigurable optical switch disclosed in the aforementioned U.S. application Ser. No. 09/691,812, which is shown in FIG. 3. Of course, those of ordinary skill in the art will recognize that the invention is equally applicable to a communication system that employs any reconfigurable optical switch in which any wavelength component received on any input port can be selectively directed to any output port, independent of the routing of the other wavelengths. In FIG. 3, the optical switch 300 comprises an optically transparent substrate 308, a plurality of dielectric thin film filters 301, 302, 303, and 304, a plurality of collimating lens pairs 321, 322, 323, and 324, a plurality of tiltable mirrors 315, 316, 317, and 318 and a plurality of output ports $340_1$, $340_2$, . . . $340_n$. A first filter array is composed of thin film filters 301 and 303 and a second filter array is composed of thin film filters 302 and 304. Individual ones of the collimating lens pairs 321-324 and tiltable mirrors 315-318 are associated with each of the thin film filters. Each thin film filter, along with its associated collimating lens pair and tiltable mirror effectively forms a narrow band, free space switch, i.e. a switch that routes individual wavelength components along different paths. The tiltable mirrors are micro mirrors such as the MEMS (microelectromechanical systems) mirrors. Alternatively, other mechanisms may be employed to control the position of the mirrors, such as piezoelectric actuators, for example.

In operation, a WDM optical signal composed of different wavelengths $\lambda_1$, $\lambda_2$, $\lambda_3$ and $\lambda_4$ is directed from the optical input port 340 to a collimator lens 314. The WDM signal traverses substrate 308 and is received by thin film filter 301. According to the characteristics of the thin film filter 301, the optical component with wavelength $\lambda_1$ is transmitted through the thin film filter 301, while the other wavelength components are reflected and directed to thin film filter 302 via substrate 308. The wavelength component $\lambda_1$, which is transmitted through the thin film filter 301, is converged by the collimating lens 321 onto the tiltable mirror 315. Tiltable mirror 315 is positioned so that wavelength component $\lambda_1$ is reflected from the mirror to a selected one of the output ports $340_1$-$340_n$ via thin film filters 302-304, which all reflect wavelength component $\lambda_1$. The particular output port that is selected to receive the wavelength component will determine the particular orientation of the mirror 315.

As mentioned, the remaining wavelength components $\lambda_2$, $\lambda_3$, and $\lambda_4$ are reflected by thin film filter 301 through lens 321 back into substrate 308 and directed to thin film filter 302. Wavelength component $\lambda_2$ is transmitted through thin film filter 302 and lens 322 and directed to a selected output port by tiltable mirror 316 via thin film filters 303-304, which all reflect wavelength component $\lambda_2$. Similarly, all other wavelength components are separated in sequence by the thin film filters 303-304 and subsequently directed by tiltable mirrors 317-318 to selected output ports. By appropriate actuation of the tiltable mirrors, each wavelength component can be directed to an output port that is selected independently of all other wavelength components.

Returning to FIG. 1, if switching elements $30_1$-$30_2$ and $32_1$-$32_2$ are reconfigurable, then when installing a set of transmitters or transponders that have been pre-selected to operate at the various channel wavelengths of the switch, the field technician can, in principle, connect any transmitter or transponder to any of the switch input ports. Once the connections are made, the switching elements can be internally reconfigured so that their input ports correspond to the operating wavelengths of the transponders to which the respective input ports are connected. That is, the switching elements are configured to conform to the sequential arrangement of the transponders rather than requiring the sequential arrangement of the transponders to conform to the configuration of the switching element. In this way a "plug and play" approach is achieved in which the technician is able to connect any transponder to any input port of the optical switches.

In order to achieve the aforementioned plug and play inter-connectability between the transponders and the optical switches, the switches must be able to detect when a transponder has been connected to one of its ports and to recognize the operating wavelength (or wavelengths in the case of a tunable transmitter) of the transmitter incorporated into that transponder. To provide this functionality, in accordance with the present invention, each transponder is associated with a memory module that identifies the operating wavelength of its transmitter. The memory modules incorporated into the transponders may be read only (ROM) or a rewritable memory such as RAM. For example, in some embodiments of the invention the memory module may be an EPROM that stores the operating wavelength or wavelengths of the transmitter located in the transponder. Further, the optical switch incorporates a controller that reads the memory module when the transponder is received by one of its input ports. In some embodiments of the invention the memory module and controller may be replaced by alternative identification mechanisms or even eliminated. For example, in some cases the technician may simply manually input an identification number such as a serial number or a model number into the switch controller.

Regardless of the mechanism by which the switch obtains the information it needs to properly configure its input ports so that they are assigned the same wavelengths as the transponders connected to those ports, the switch in turn provides this information to software resident in the transmission network. This software may reside in a network management element that operates at the highest level of network control. When a new service is to be provisioned between the switch and another node in the network, the software can compare the wavelengths that are available on the transmission path with the operating wavelengths of the transponders that have been installed in the switch. If there is a match, the software can establish the connection at the appropriate wavelength. This process is much less prone to error because it is controlled by software and is not dependent on manual provisioning by a technician. Moreover, when there is no match between the available wavelengths and the operating wavelengths of the transponders, the network software can alert the technician or the network operations center so that an unsuitable transponder can be replaced with an appropriate transponder operating at an appropriate wavelength. A transponder may be unsuitable for a variety of reasons, including, for example, because it operates at the wrong wavelength, transmission rate, or in the wrong transmission format. Additionally, a transmitter that has been installed in a switch may also be unsuitable because of a hardware failure or because of technician error during the installation process.

Figure 4:
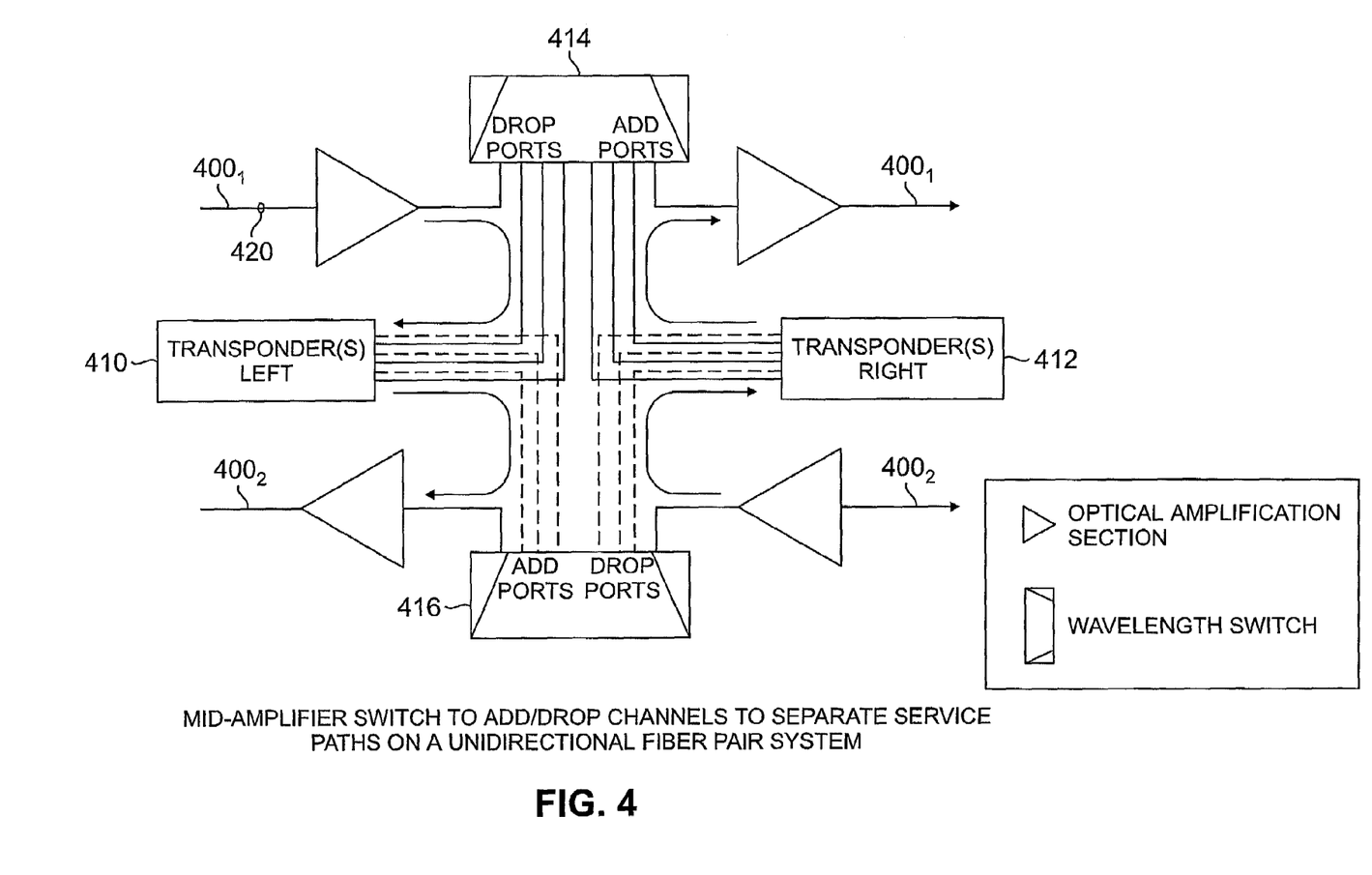
FIG. 4 shows an exemplary network node that provides protected services in the event of a fault.
Figure 5:
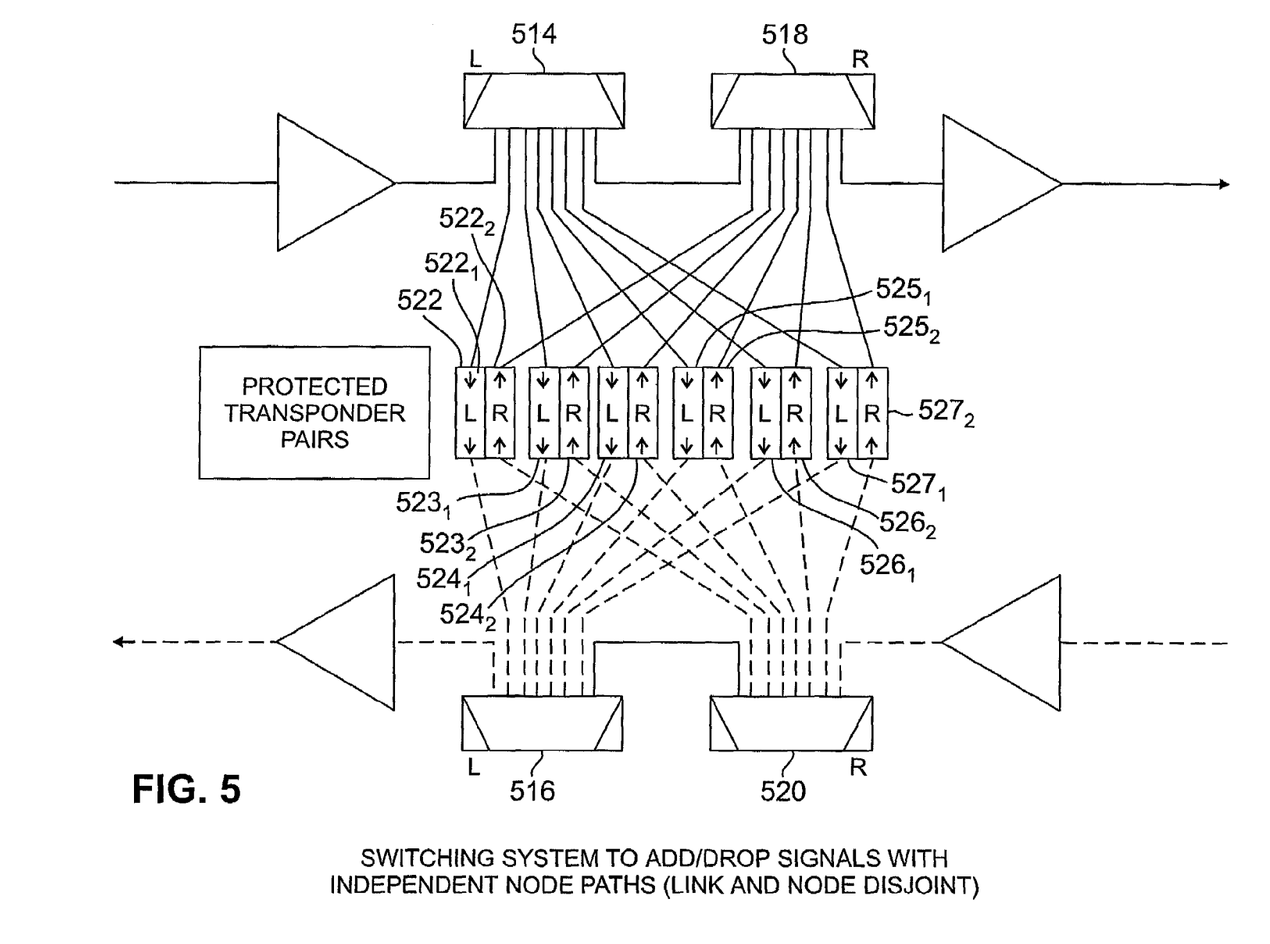
FIG. 5 shows another network node that provides an additional degree of protection services in the event of a fault.

The aforementioned inventive plug and play arrangement for installing transponders is applicable not only to WDM communication systems of the type depicted in FIG. 1, but also to communication systems that employ more complex arrangements of transponders and switches for the purpose of providing varying degrees of redundancy to ensure that service will be maintained in the event of a failure in a component or the transmission path. Redundancy is typically provided in such systems for two failure scenarios. One is to provide protection from a transponder failure by providing a duplicate backup transponder on both ends of the service to transmit information should either of the first transponders fail. The second protects against a fiber cut by providing two diverse paths (fibers) over which a signal can travel between the source and destination, where the signal source may come from two transponders, or be switched between paths from a single transponder. In practice, the transponder failure impacts one wavelength (service) and occurs more frequently than a fiber cut, which will impact all the wavelengths in the fiber. Therefore since the network impact in these scenarios is different, the protection requirement for either of these options will depend on the type of services in the optical layer, and whether such services are protected at other layers in the network (i.e. via transmission protocol). The most reliable optical protection from a network equipment perspective is using a source pair of transponders that are simultaneously routed via different paths to a destination transponder pair. The signals are routed between each transponder via an electrical backplane, where upon failure of the signals along a working path the transponders will change the signal source to the protection path, thereby ensuring communication after a failure. The inventive plug and play arrangement advantageously facilitates the implementation of this type of redundancy because the protection transponders can always be inserted in adjacent slots, resulting in a less challenging backplane design because the degradation of high frequency electrical signals is reduced by minimizing the backplane interconnection lengths in this manner. Moreover, this plug and play arrangement may be used by the communication system to automatically restore service when a failure does arise without the need for manual reconfiguration. The forthcoming description of different protection types will be described for the purposes of this invention in the more reliable implementation, which uses redundant transponders to protect against transponder failures and fiber cuts. It should be understood that if only fiber cut protection is required, and not transponder protection, a single transponder with an optically switched path could be employed in the same geometry to reduce cost. FIGS. 4-5, which illustrate exemplary nodes incorporating such protection schemes, will be presented after the following discussion of various conventional protection schemes A number of different well-known protection techniques may be used in connection with networks that employ nodes that incorporate backup transponders. For example, in a ring network a dedicated protection technique can be used in which two copies of the same information-bearing signal are transmitted in opposite directions around the ring. While both signals can be transmitted at the same or different wavelengths, it generally will be more efficient to use the same wavelength because this fully utilizes the ring's capacity at that wavelength while placing no restrictions on the use of other wavelengths because of wavelength blocking. While a dedicated protection technique is an extremely reliable and rapidly responsive form of protection, a disadvantage of dedicated protection is that it is extremely rare that the backup signal will ever be used, thus making it an inefficient and hence expensive form of protection. Accordingly, it is often desirable to share a backup channel path among many in-service channels since it is unlikely more than one in-service channel will fail at any one time. Such protection is referred to as shared protection and is typically implemented by reserving a single channel as a back-up channel to protect multiple channels traveling different paths on another wavelength. A disadvantage of shared protection is that restoration generally takes more time after a failure and requires more network signaling than dedicated protection because the backup channel is not already transmitting the signal at the time of failure. Since shared protection requires the backup transmitter and appropriate switches to be activated, it also has a greater probability of not restoring service because of a component failure during the restoration process. Because dedicated and shared protection schemes offer different advantages and disadvantages, different customers may prefer one over the other and thus service providers might ideally want to offer both schemes on the same network and even from the same transponder slot, if this could be arranged with minimal difficulty.

Traditional optical layer protection schemes such as the aforementioned dedicated and shared protection schemes, which employ multiple transponders to route light over diverse paths to a common destination, are fundamentally inefficient. This is particularly true because it is somewhat uncommon for the "primary" or "working" transponder to fail, and therefore the "spare" or "backup" transponder is rarely utilized. Since a network operator typically has more than one protected service at a given node, and multiple transponders are unlikely to fail at the same time, one way to leverage poor transponder utilization is to protect N different transponders with a smaller number of backup transponders. For example, in FIG. 1, one or more of the transponders $20_1$-$20_6$ may serve as backup for the remaining transponders $20_1$-$20_6$. Similarly, one or more of the transponders $60_1$-$60_6$ may serve as backup for the remaining transponders $60_1$-$60_6$. This arrangement can be called 1:N protection, where N working transponders are protected with 1 backup transponder. One problem with 1:N protection in more advanced optical networks is that the entire path through a wavelength-routed network must be reconfigured during the transition to the backup transponder unless the backup transponder can transmit at the same wavelength as the primary transponder it is replacing. Such a path reconfiguration is extremely undesirable because it requires network-wide communication and reconfiguration, which leads to an additional delay in service restoration. Moreover, if the backup transponder does not employ the same wavelength as the failed transponder, further inefficiencies arise because one or more additional wavelengths must be reserved along all potentially protected paths, thereby setting aside bandwidth which otherwise could be used for revenue generating services. For these reasons it would advantageous to protect N transponders operating at different wavelengths with a single backup transponder that is tunable so that its output can emit the same wavelength as any of the N primary transponders, should any of them fail.

The use of a reconfigurable switch with an 1:N protection scheme is highly desirable because the switch controls the coupling of both the working and protection transponders to the transmission system, which means that the switch can prevent the protection transponder from transmitting through the system until a protection state is activated. When this does occur, the switch can preferably only allow the appropriate wavelength to be coupled into the transmission system to replace the failed transponder, and this coupling can be provided at an insertion loss that is similar to original transponder. This functionality enables the working and protection transponders to offer similar optical transmission capabilities when their transmitters have the same output power, which means there could be only one code of transponder for either application. It also controls from the system perspective which transponder receives a given incoming wavelength. This arrangement isolates the remaining transponders from any errant power output arising from the working and/or protection transponders that participate in providing protection. Finally, it also allows all protection events and actions to be isolated to the individual node in which the transponder fails, which reduces the time needed to restore service and simplifies the controlling software needed to provide the restoration.

It is worth noting that a 1:N protection scheme as described above only protects against a transponder failure and not a fiber cut. That is, if all N outputs are traveling on a single fiber and the fiber is cut, all N services will be disconnected. However, it should also be noted that transponder failures generally occur much more frequently that fiber cuts, and therefore the 1:N protection scheme is a suitable solution for many applications, even without reserving bandwidth for a fiber cut. If the advantages of 1:N protection are desired while protecting for a fiber cut, a hybrid protection scheme could be employed with the present invention using 1:N transponder protection and shared protection against a fiber cut. In this embodiment, the shared protection would be implemented with a single transponder having a tunable wavelength output that circumvents fiber cuts by optically switching between two paths. Failure of the transponder would also be protected via conventional 1:N protection as described above, using a different wavelength tunable transponder. This form of protection would eliminate both the inefficiency of protection fiber paths that are rarely used, and also would eliminate the inefficiency from the need to require many backup transponders that are seldom used. The disadvantage of this approach would be a complex, longer protection switching time to configure all the switches and tunable transponders, and an inability to protect against multiple transponder failures that are sharing a single protection transponder.

Returning now to the discussion of exemplary inventive nodes incorporating various protection schemes, FIG. 4 shows a node that includes two sets of transponders 410 and 412. Each set 410 and 412 includes a series of transponders operational at the different wavelengths that correspond to the various channel wavelengths employed in the transmission system. Transponders 410 receive signal wavelengths from transmission path $400_1$, via switch 414 and transmit signal wavelengths on transmission path $400_2$ via switch 416 while transponders 412 receive signal wavelengths from transmission path $400_2$ via switch 416 and transmit signal wavelengths on transmission path $400_1$ via switch 414. By using the two transponder sets 410 and 412 instead of a single set of transponders, a degree of redundancy is provided to ensure that service will be maintained if, for example, a fiber cut occurs at a single point in either transmission path $400_1$ or $400_2$. For example, a fiber cut at point 420 on path $400_1$ will disrupt service provided by transponders 410 but not transponders 412. Accordingly, in this situation transponders 412 can be used to maintain service. However, a fiber cut in both transmission paths $400_1$ and $400_2$ will disrupt service provided by both sets of transponders 410 and 412. Nevertheless, the configuration shown in FIG. 4 provides relatively high reliability because it is unlikely that there would be a simultaneous failure at multiple points in the transmission paths. Other types of failures, however, will cause all service to be interrupted. For example, should a failure occur in either of the switches 414 and 416, service provided by both sets of transponder sets 410 and 412 will be disrupted.

FIG. 5 shows another node configuration that provides an additional degree of protection relative to the configuration shown in FIG. 4. In contrast to the node in FIG. 4, which employs two switches 414 and 416, the node in FIG. 5 employs four switches 514, 516, 518 and 520. In this configuration service can be maintained even if there is a failure in one of the switches. As shown, the transponders are arranged in transponder pairs 522-527 located in adjacent slots. The individual transponders in each pair can serve as backup for the other in case of a failure. Similar to the configuration in FIG. 4, the transponders in each pair communicate with different switches. For example, in pair 522, transponder $522_1$ receives and transmits via switches 514 and 516, respectively, while transponder $522_2$ receives and transmits via switches 520 and 518, respectively. Since the two transponders in each pair transmit and receive on completely different switches, a failure in one switch need not disrupt service because the service provided by the impacted switch can be provided by the other transponder in the adjacent slot.

The present invention offers the requisite degree of flexibility to quickly and easily reconfigure a service to support a variety of different protection schemes such as the aforementioned dedicated, shared, or 1:N protection schemes or even other protection schemes such as Dual Ring Interworking (DRI) for example, which uses the Drop and Continue feature that is discussed later in connection with FIG. 8 to split a signal in the node so that it can be dropped at multiple locations for interconnection to network For example, referring again to FIG. 5, if transponder $522_2$ is to serve as a backup for transponder $522_1$, then the network software can provision the switches for either a dedicated or shared protection scheme, eliminating the need for a technician to manually reconfigure the network. Moreover, if transponder $522_2$ incorporates a tunable transmitter, a dedicated protection channel may even be offered at the same wavelength as the in-service channel. The advantages that arise from the use of the inventive plug and play arrangement when reconfiguring a service for different protection schemes are similar to the advantages obtained when using the inventive arrangement to initially install transponders in a switch. However, its use in connection with services having various protection schemes is particularly advantageous because such a service installation procedure is particularly complex to perform manually. In addition, the combination of an optical backplane and the flexible switch enables any two adjacent slots to transmit on any wavelength, thereby enabling multiple protection schemes from the same configuration while minimizing the complexity of the optical interconnections at installation as well as the cost and complexity of the electrical backplane.

One disadvantage of the node configuration shown in FIG. 5 is that it is relatively expensive to implement because it requires four optical switches. In some embodiments of the invention a cost savings may be obtained by replacing one or both switches 518 and 516, which serve as add switches for adding wavelengths to the transmission system, with an arrangement of passive optical combiners such as couplers shown in FIG. 5, or alternatively, with 1×N star couplers for larger port count implementations. Each transponder may be connected to a passive coupler that in turn couples the wavelength to a series of one or more additional passive couplers that couple the resulting WDM signal to the transmission system. For instance, in FIG. 6 the add switch 518 of FIG. 5 is replaced with an arrangement of passive couplers 618. It is to be understood that FIG. 6 only shows a single transmission path $600_1$, and thus does not illustrate switches 516 and 520, nor transponder pairs 522-527, which are shown in FIG. 5. In addition to its reduced cost, the use of a passive coupling arrangement is advantageous because it allows the wavelengths to pass through only a single wavelength selective element per node, which minimizes the effects of bandwidth narrowing that arise when the wavelengths pass through a series of filters, which do not, of course, exhibit ideal square filter functions. A disadvantage of this approach is that the passive coupler arrangement has a relatively large insertion loss that scales with the number of transponders connected to the arrangement. Other disadvantages are its inability to block errant wavelengths from entering the transmission system or to control the attenuation of the wavelengths when they are added to the transmission system so that the added channel power can be equalized with the other channels passing through the node. Accordingly, the arrangement shown in FIG. 6 is generally appropriate when cost is a major factor and there is an excess of transmitter power available.

Figure 6:
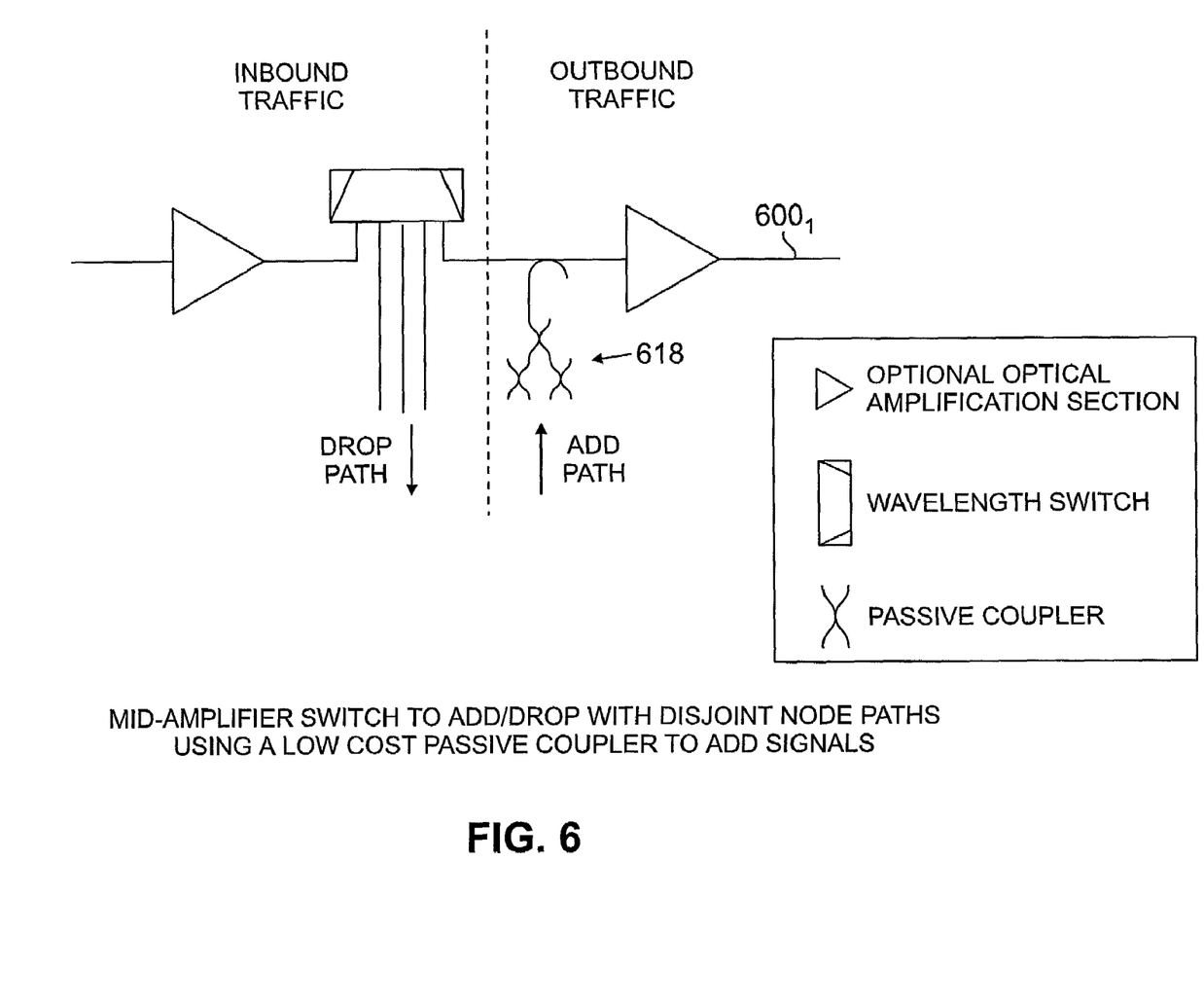
FIG. 6 shows a network node similar to that of FIG. 5 in which one of the optical switches is replaced with passive couplers.
Figure 7:
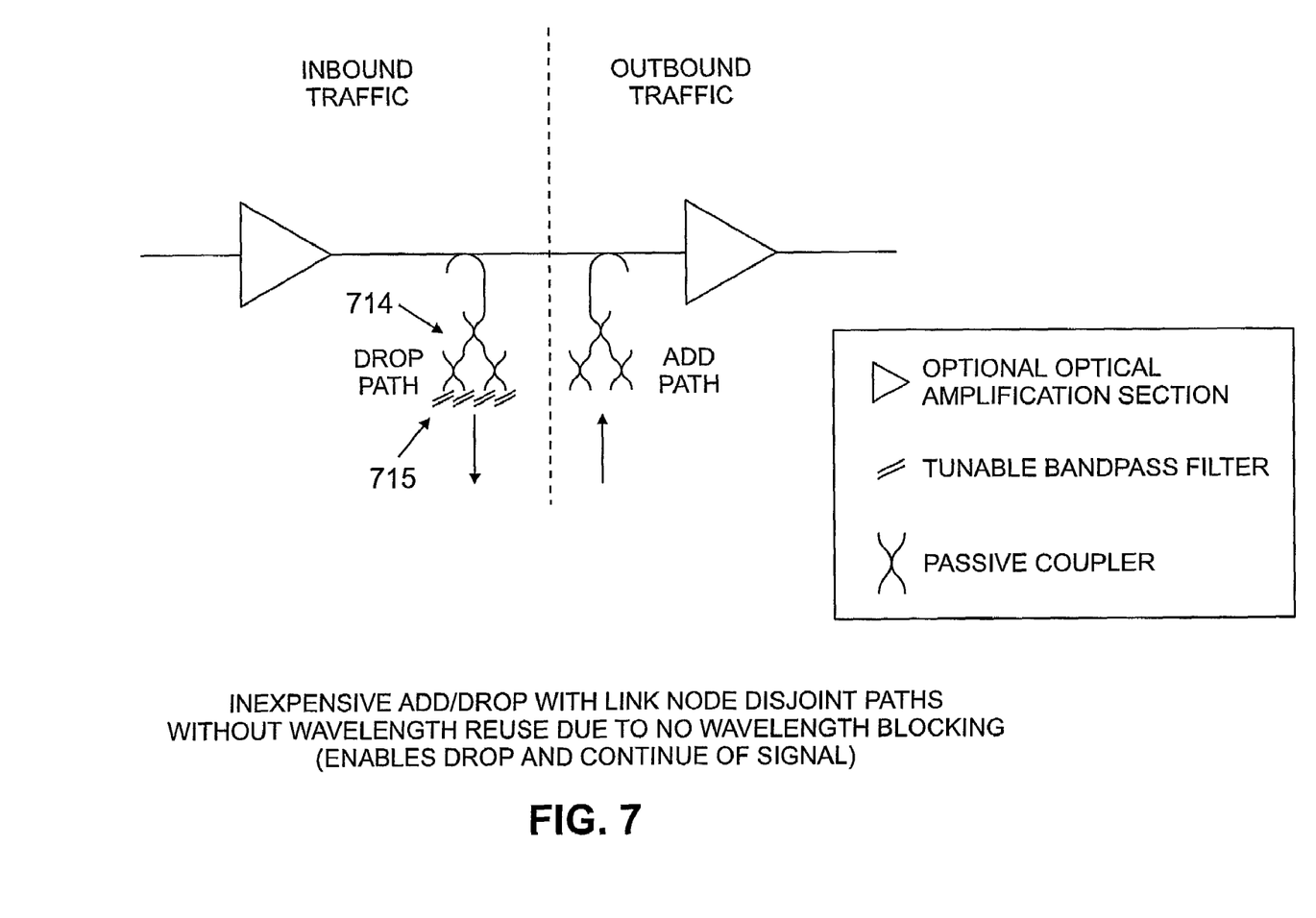
FIG. 7 shows a network node similar to that of FIG. 6 in which another of the optical switches is replaced with a splitter followed by tunable bandpass filters.

While in FIG. 6 the add switch 518 of FIG. 5 is replaced with passive couplers 618, FIG. 7 shows another embodiment of the invention in which the drop switch 514 of FIG. 5 is replaced with a passive splitter 714 followed by tunable bandpass filters 715, each of which couple one of the dropped wavelengths to the appropriate transponder (not shown in FIG. 7). This all-passive configuration further reduces the cost of the node, although it may require additional optical amplifiers to accommodate the losses imparted by the passive splitters. One characteristic of this all-passive configuration is that not all the power in a dropped channel is in fact entirely dropped. Rather, because no filtering is performed, a portion of the dropped channel exits the node and continues along the transmission path. This characteristic can be advantageous when there is a need to create multiple copies of a signal or to broadcast a signal. Unfortunately, this characteristic also prevents wavelengths from being reused because crosstalk would arise between the portion of the dropped channel remaining on the transmission path and the added channel located at the same wavelength. However, the primary disadvantage of the configuration shown in FIG. 7 is that it is very bandwidth inefficient and thus unattractive unless the number of available wavelengths is greater than the total number of connections to be used in the network.

Figure 8:
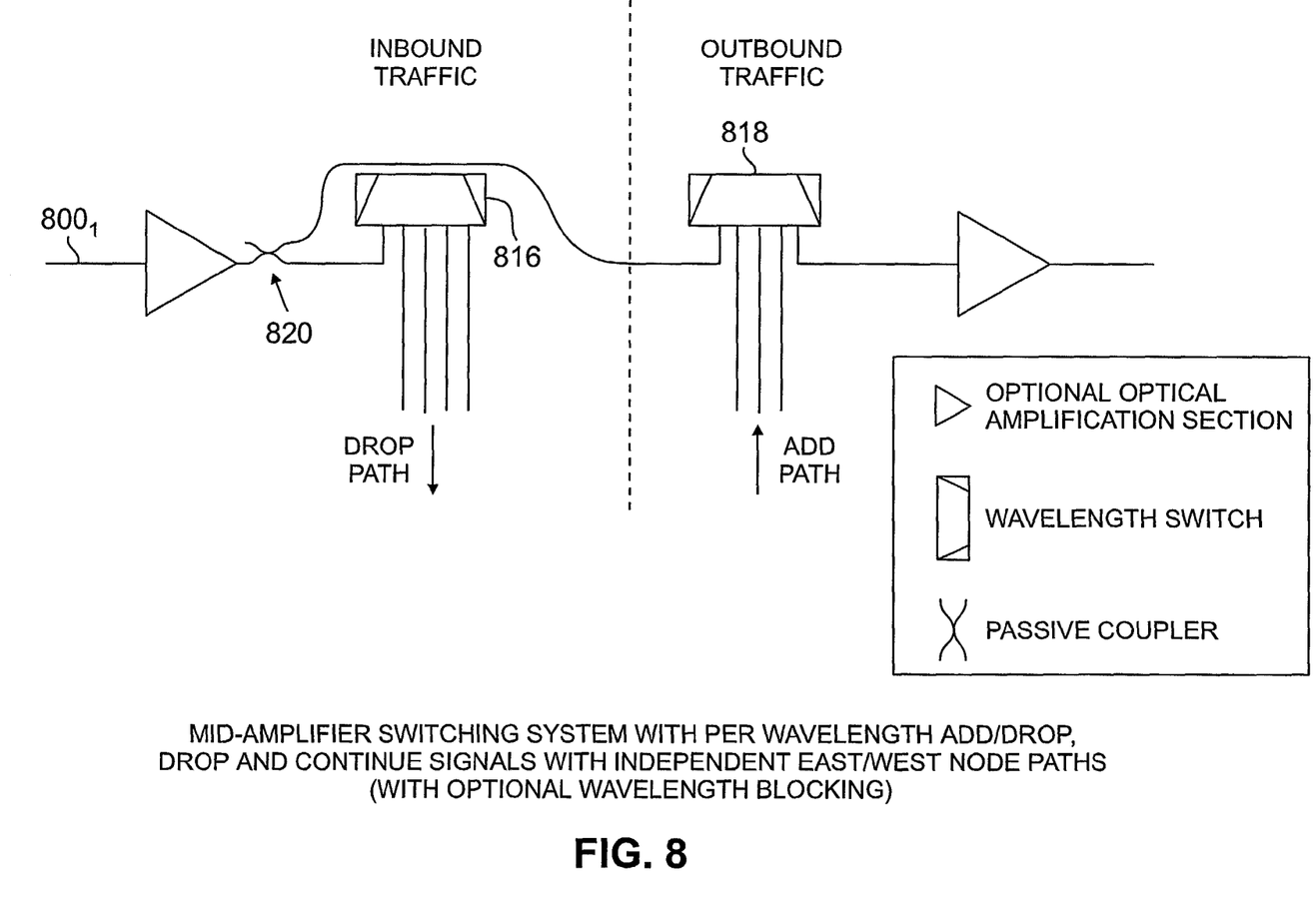
FIG. 8 shows yet another network node configuration.

FIG. 8 shows another node that can perform the drop and continue functionality of the node in FIG. 7, but which also allows wavelengths to be reused. In this configuration two switches are employed along each transmission path. As shown, switches 816 and 818 serve as drop and add switches, respectively (see the discussion of switches 514 and 518 in FIG. 5). A passive coupler 820 preceding switch 816 splits the WDM signal traveling on transmission path $800_1$ as it enters the node. One output of the passive coupler 820 is coupled to optical switch 816 and the other output of the passive coupler 820 is coupled to an input of switch 818. Switch 818 can therefore remove any wavelengths dropped by switch 816 that were not designated for multicast transmission. The capability to transmit multicast can be used in the communication network to broadcast to multiple locations from a single transponder, or to create a dual-homing diverse path for network protection of an optical signal. As discussed earlier, Dual Ring Interworking is an example of dual homing, wherein the diverse routing between two rings occurs at separate node-pairs.

The ability to reuse wavelengths within an optical network such as in FIG. 8 is one key means to improve overall network efficiency. Because there is an effective network cost to provide the facilities to transport a given wavelength, if that wavelength is used for multiple transport links within a ring or network, the cost of the wavelength is shared. Current technology requires filtering or removal of the dropped wavelength on the order of 99.9% if the wavelength is to be reused. This wavelength-dependent filtering is preferably performed while adding minimal loss to the adjacent wavelengths, which are typically only separated by 1 nm or less in current WDM systems. Technologies that are unable to meet this demanding filtering requirement with the wavelength filtering used in the drop path may also employ additional filtering to achieve the level required to reuse the same wavelength at other points in the network. The element providing this additional filtering is sometimes referred to as a clean up filter or a blocking filter. The blocking filter may be a distinct filter element or it may be integrated with the drop element itself. An example of a blocking filter with the latter configuration is shown, for example, in Duck et al, U.S. Pat. No. 5,920,411. The drop and continue configuration shown in FIG. 8 is one specific example of a blocking switch, where the passive coupler 820 does not block the wavelengths that will be dropped, and thus the second switch 818 must block the dropped wavelengths as well as adding wavelengths to the network.

Another situation addressed by the present invention arises when the transponders include tunable lasers. In this case it is important to multiplex any of the wavelengths generated by the tunable lasers onto the data stream of the network with a low and constant loss. In current systems this is accomplished with a multiplexer having ports that generally each offer low insertion loss at a single wavelength. Thus, the flexibility of the tunable laser is restricted by the multiplexer so that the laser can only be used at the single wavelength. One way to overcome this problem is by using a passive coupler that couples all wavelengths with the same insertion loss. Of course, this solution comes at the expense of higher insertion loss. The present invention, however, provides an alternative solution to this problem because the reconfigurable switch can serve as a low loss reconfigurable multiplexer. When used in cooperation with a tunable laser, any of the wavelengths generated by the laser can be multiplexed onto the data stream with low loss. This solution is particularly advantageous because it enables systems to operate in accordance with the same engineering rules for both fixed and tunable lasers, which is important in hybrid systems using fixed and tunable transponders.

The invention claimed is:

1. A node for use in a WDM optical communication system that includes a plurality of nodes interconnected by communication links, the node comprising:

a first plurality of transponders each generating and/or receiving an information-bearing optical signal at a different channel wavelength from one another;

an optical coupling arrangement transferring the channel wavelengths between a link connected to the node and the first plurality of transponders, said arrangement being adaptable to reconfigure its operational state to selectively direct different ones of the channel wavelengths from the link to different ones of the transponders without disturbing the optical path through the node traversed by any other channel wavelengths, wherein said optical coupling arrangement includes a tunable coupling arrangement for selectively transferring the different ones of the channel wavelengths from the link to the first plurality of transponders and a passive coupling arrangement for directing the channel wavelengths from transponders to the link, said optical coupling arrangement further including a reconfigurable optical switch having at least three ports, said reconfigurable optical switch being adaptable to reconfigure its operational state to receive at a plurality of the ports any of the channel wavelengths at which the first plurality of transponders operate and direct said channel wavelengths to any remaining ones of the ports of the optical switch; and a communications and configuration arrangement transferring data identifying the respective channel wavelengths at which the transponders operate from the transponders to the optical coupling arrangement and, in response to the transferred data, reconfiguring the operational state of the optical coupling arrangement.

2. The node of claim 1, wherein the first plurality of transponders respectively include a plurality of receivers receiving the information-bearing optical signals, and further wherein the communications and configuration arrangement reconfigures the operational state of at least the portion of the optical coupling arrangement transferring the channel wavelengths from the link to the first plurality of transponders so that the transponders can receive optical signals at the channel wavelengths at which they respectively operate.

3. The node of claim 1, wherein said transponders each include an identifying element containing data identifying the respective channel wavelengths at which the transponders operate, said optical coupling arrangement having a receiving element for obtaining the data contained in the identifying element.

4. The node of claim 3, wherein the identifying element is a serial or model number and the receiving element is an alphanumerical input through which the data is manually received.

5. The node of claim 3, further comprising means for communicating the data from the identifying element in the transponders to the node.

6. The node of claim 3, wherein the identifying element is a memory module and the receiving element includes a processor for reading the data from the memory module when the transducer is coupled to the optical coupling arrangement.

7. The node of claim 1, further comprising a second plurality of transponders serving as backup transponders in the event of a failure in one or more of the transponders in the first plurality of transponders.

8. The node of claim 7, wherein the first and second plurality of transponders are arranged in transponder pairs comprising transponders from each of the first and second plurality of transponders.

9. The node of claim 8, wherein the transponders in each of the transponder pairs are located in adjacent slots in electrical connection with one another for transferring electrical data signals therebetween.

10. The node of claim 9, wherein the transponders in each of the transponder pairs operate at a common channel wavelength.

11. The node of claim 9, wherein, the transponders in at least one of the transponder pairs are operable at either a common channel wavelength or a different channel wavelength.

12. The node of claim 1, further comprising a blocking filtering element for filtering from the link channel wavelengths dropped by the optical coupling arrangement.

13. The node of claim 1, wherein the first plurality of transponders are respectively located in a plurality of transponder slots each of which optically communicates with a predetermined one of the ports of the optical switch.

14. The node of claim 1, wherein the data identifying the respective channel wavelengths at which the transponders operate is the respective channel wavelengths themselves.

15. A node, for use in a WDM optical communication system that includes a plurality of nodes interconnected by communication links, the node comprising:
- a first plurality of transponders each generating and/or receiving an information-bearing optical signal at a different channel wavelength from one another;
- an optical coupling arrangement transferring the channel wavelengths between a link connected to the node and the first plurality of transponders, said arrangement being adaptable to reconfigure its operational state to selectively direct different ones of the channel wavelengths from the link to different ones of the transponders without disturbing the optical path through the node traversed by any other channel wavelengths;
- a communications and configuration arrangement transferring data identifying the respective channel wavelengths at which the transponders operate from the transponders to the optical coupling arrangement and, in response to the transferred data, reconfiguring the operational state of the optical coupling arrangement; and
- further comprising a second plurality of transponders serving as backup transponders in the event of a failure in one or more of the transponders in the first plurality of transponders,
- wherein said optical coupling arrangement includes at least two reconfigurable optical switches each having at least three ports, a first of said reconfigurable optical switches being adaptable to reconfigure its operational state to drop channel wavelengths to the first plurality of transponders and receive channel wavelengths from the second plurality of transponders, a second of said reconfigurable optical switches being adaptable to reconfigure its operational state to drop channel wavelengths to the second plurality of transponders and receive channel wavelengths from the first plurality of transponders.

16. A node for use in a WDM optical communication system that includes a plurality of nodes interconnected by communication links, the node comprising:
- a first plurality of transponders each generating and/or receiving an information-bearing optical signal at a different channel wavelength from one another;
- an optical coupling arrangement transferring the channel wavelengths between a link connected to the node and the first plurality of transponders, said arrangement being adaptable to reconfigure its operational state to selectively direct different ones of the channel wavelengths from the link to different ones of the transponders without disturbing the optical path through the node traversed by any other channel wavelengths; and
- a communications and configuration arrangement transferring data identifying the respective channel wavelengths at which the transponders operate from the transponders to the optical coupling arrangement and, in response to the transferred data, reconfiguring the operational state of the optical coupling arrangement,
- wherein said optical coupling arrangement includes at least two passive coupling arrangements and two reconfigurable optical switches each having a plurality of ports, wherein a first transponder in each of the transponder pairs sends and receives channel wavelengths from a first of the passive coupling arrangements and a first of the optical switches associated therewith and a second transponder in each of the transponder pairs sends and receives channel wavelengths from a second of the passive coupling arrangements and a second of the optical switches associated therewith.

17. A node for use in a WDM optical communication system that includes a plurality of nodes interconnected by communication links, the node comprising:
- a first plurality of transponders each generating and/or receiving an information-bearing optical signal at a different channel wavelength from one another;
- an optical coupling arrangement transferring the channel wavelengths between a link connected to the node and the first plurality of transponders, said arrangement being adaptable to reconfigure its operational state to selectively direct different ones of the channel wavelengths from the link to different ones of the transponders without disturbing the optical path through the node traversed by any other channel wavelengths; and
- a communications and configuration arrangement transferring data identifying the respective channel wavelengths at which the transponders operate from the transponders to the optical coupling arrangement and, in response to the transferred data, reconfiguring the operational state of the optical coupling arrangement,
- wherein said optical coupling arrangement includes at least two reconfigurable optical switches each having a plurality of ports and a passive coupler having an input port receiving channel wavelengths from the link and first and second output ports respectively coupled to ports of the two reconfigurable switches such that a first of the reconfigurable optical switches serves as a drop switch selectively directing different ones of the channel wavelengths from the link to different ones of the transponders and further such that a second of the reconfigurable optical switches serves as an add switch selectively directing different ones of the channel wavelengths from the transponders to the link, whereby at least one given channel wavelength can be both dropped by the drop switch and transmitted back to the link by the add switch.

18. The node of claim 17, wherein said given channel is a broadcast channel.

19. The node of claim 17, wherein said given channel is a dual homing path protection channel.

* * * * *